(12) United States Patent
Harriman et al.

(10) Patent No.: US 6,496,895 B1
(45) Date of Patent: Dec. 17, 2002

(54) METHOD AND APPARATUS FOR INTIALIZING A HUB INTERFACE

(75) Inventors: David J. Harriman, Sacramento, CA (US); Jasmin Ajanovic, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/430,996

(22) Filed: Nov. 1, 1999

(51) Int. Cl.[7] .............................. G06F 13/00; G06F 1/12
(52) U.S. Cl. ........................................ 710/306; 713/400
(58) Field of Search .............................. 710/306, 311, 710/316, 105, 107, 113, 119; 713/322, 400, 600

(56) References Cited

U.S. PATENT DOCUMENTS 6,145,039 A * 11/2000 Ajanovic et al. ............ 710/105
6,256,697 B1 * 7/2001 Ajanovic et al. ............ 710/113
6,374,317 B1 * 4/2002 Ajanovic et al. ............ 710/105

* cited by examiner

*Primary Examiner*—Glenn A. Auve
(74) *Attorney, Agent, or Firm*—Blakley, Sokoloff, Taylor & Zafman LLP

(57) ABSTRACT

A first control hub component, within a computer system, having a first logic to synchronize an internal clock generator of the first control hub with an external clock generator in response to the external clock generator transitioning to a high power state. In response to the internal clock generator being synchronized with the external clock generator, the first logic initiates the first control hub to transmit a request packet to a second control hub via an interface. The first logic monitors the interface for receipt of a completion packet in reply to the request packet, wherein in response to the completion packet the first control hub is operable to continue communication with the second hub via the interface.

16 Claims, 13 Drawing Sheets

METHOD AND APPARATUS FOR INTIALIZING A HUB INTERFACE

FIELD OF THE INVENTION

The present invention pertains to the field of computer systems, and, in particular, an interface between hub components within a computer system.

BACKGROUND OF THE INVENTION

Prior computer systems typically rely on busses such as the Peripheral Component Interconnect (PCI) bus adhering to a Specification Revision 2.2 bus developed by the PCI Special Interest Group of Portland Oregon, to allow computer system chipset components to communicate with one another. For example, a transaction originating at a processor and intended for a disk drive might first be delivered to a first chipset component that serves as an intermediary between the processor bus and a PCI bus. The first chipset component would then deliver the transaction over the PCI bus to a second system chipset component which would then deliver the transaction to the disk drive.

Busses such as the PCI bus also provide for communication with other computer system devices such as graphics controllers and network adapters. Because busses such as the PCI bus must interface with a variety of component types, each with varying requirements, the busses are not necessarily optimized for allowing communication between chipset components. Further, chipset manufacturers who rely on standardized busses such as the PCI bus must adhere to bus standards in order to ensure compatibility with other components, and are not at liberty to make substantial changes in how the chipset components communicate with each other.

Another issue that faces chipset component manufacturers in designing and manufacturing chipset components is the need to conform to standardized supply and signaling voltages when relying on busses such as PCI for communication between chipset components, thereby locking the manufacturers into certain design practices and manufacturing technologies. Therefore, it would be desirable to provide a flexible interface that provides optimal communication between chipset components.

In addition, it would be desirable to provide an improved method and apparatus for initializing components coupled to such an interface. More specifically, if components coupled via an interface, are transitioning from a low power state to a higher power state, each component may have to wait for a predetermined period of time to lapse before they may begin transmitting and receiving data across the interface. Such a technique is inefficient because both components may both be awake prior the lapsing of the predetermined period of time. As a result, the components would have to unecessarily wait the additional length of time before they could transmit data. Alternatively, the predetermined period of time may not be long enough for one of the components to awake. Therefore, there is a need for an improved method of initializing an interface between to computer components.

SUMMARY OF THE INVENTION

The present invention provides a first control hub component, having a first logic to synchronize an internal clock generator with an external clock generator in response to the external clock generator transitioning to a high power state. In response to the internal clock generator being synchronized with the external clock generator, the first control hub transmits a request packet to a second control hub via an interface. The first logic monitors the interface for receipt of a completion packet in reply to the request packet, wherein in response to the completion packet, the first control hub is operable to continue communication with the second hub via the interface.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A method and apparatus for initializing a hub interface architecture is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Figure 1:
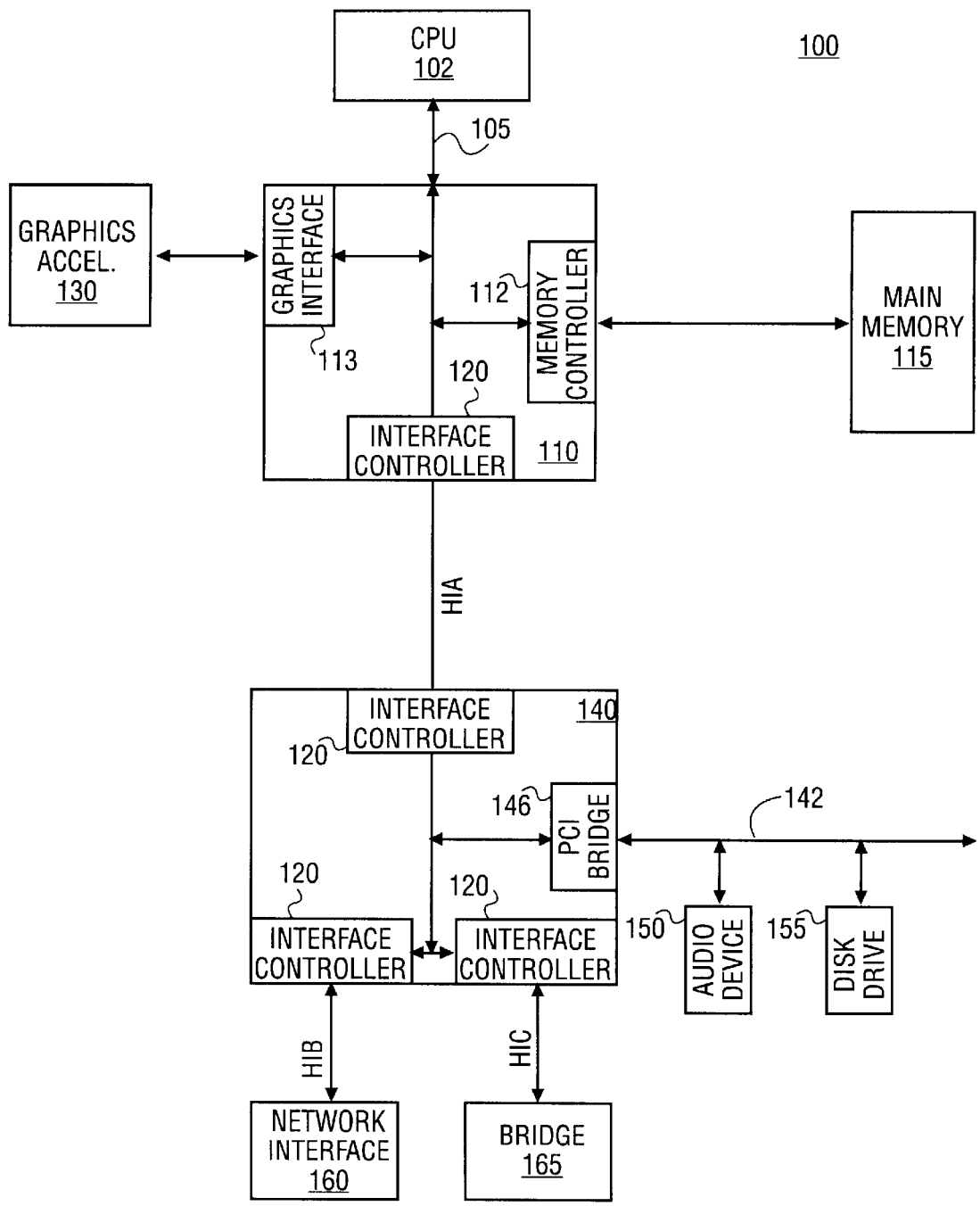
FIG. 1 is a block diagram of one embodiment of a computer system.

FIG. 1 is a block diagram of one embodiment of a computer system 100. Computer system 100 includes a central processing unit (CPU) 102 coupled to bus 105. In one embodiment, CPU 102 is a processor in the Pentium® family of processors including the Pentium® III processor family available from Intel Corporation of Santa Clara, Calif. Alternatively, other CPUs may be used.

A memory control hub (MCH) 110 is also coupled to bus 105. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to bus 105, such as multiple CPUs and/or multiple system memories.

MCH 110 may also include a graphics interface 113 coupled to a graphics accelerator 130. In one embodiment, graphics interface 113 is coupled to graphics accelerator 130 via an accelerated graphics port (AGP) that operates according to an AGP Specification Revision 2.0 interface developed by Intel Corporation of Santa Clara, Calif. In addition, MCH 110 includes a hub interface control 120. Interface control 120 is used to couple MCH 110 to an input/output control hub (ICH) 140 via a hub interface A. ICH 140 provides an interface to input/output (I/O) devices within computer system 100. ICH 140 also includes a hub interface control 120 that is used for coupling to MCH 110.

According to one embodiment, ICH 140 may include other interface controls 120. For example, a second interface control 120 may be coupled to a network interface 160 via a hub interface B. In addition, a third interface control 120 may be coupled to a bridge 165. Bridge 165 may provide an interface between ICH 140 and a system bus. Bridge 165 is coupled to ICH 140 via a hub interface C. In one embodiment, the system bus coupled to bridge 165 is an external PCI bus. One of ordinary skill in the art will appreciate that hub interface controls 120 may be coupled to other devices.

Devices coupled together via a hub interface may be referred to as hub interface agents. A hub interface agent that is positioned closer to CPU 102 in computer system 100 in terms of travel distance may be referred to as an upstream agent, while an agent that is further away from CPU 102 is referred to as a downstream agent. For example, for the MCH 110/ICH 140 hub interface, MCH 110 is the upstream agent and ICH 140 is the downstream agent.

ICH 140 may also include an internal PCI bridge 146 that provides an interface to a PCI bus 142. PCI bridge 146 provides a data path between CPU 102 and peripheral devices. Devices that may be coupled to PCI bus 142 include an audio device 150 and a disk drive 155. However, one of ordinary skill in the art will appreciate that other devices may be coupled to PCI bus 142. In addition, one of ordinary skill in the art will recognize that CPU 102 and MCH 110 could be combined to form a single chip. Further graphics accelerator 130 may be included within MCH 110 in other embodiments.

Figure 2:
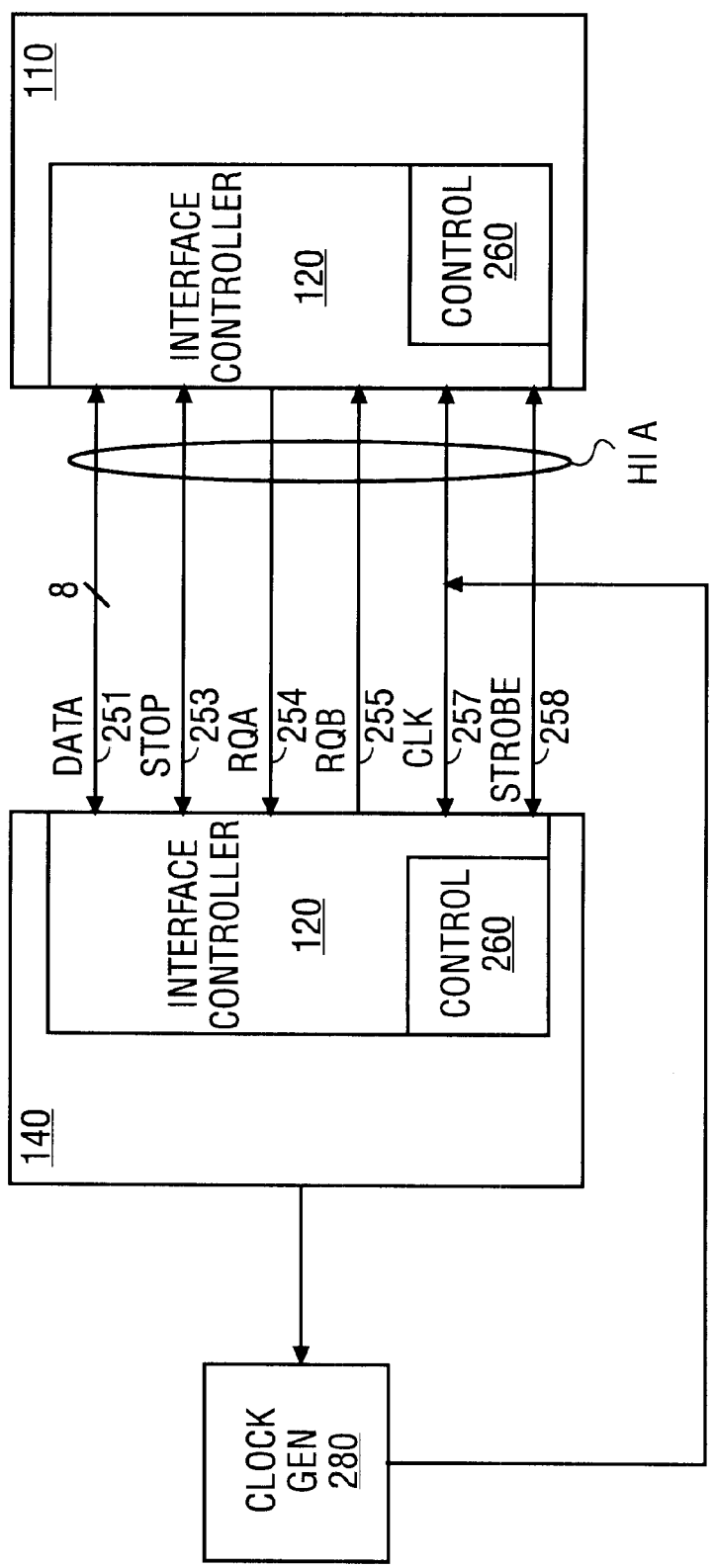
FIG. 2 is a block diagram of one embodiment of a memory control hub (MCH) and an input/output control hub (ICH) connected via a hub interface bus.

FIG. 2 is a block diagram of one embodiment of MCH 110 coupled to ICH 140 via hub interface A. A hub interface is a mechanism for connecting main building blocks of the core logic of a computer system, such as computer system 100, via a relatively narrow and relatively high bandwidth data path. Between individual components in computer system 100, such as between MCH 110 and ICH 140, the connection is implemented in a point-to-point fashion. According to one embodiment, transfer of information across the hub interface bus is accomplished using a packet-based split-transaction protocol. More detail about hub interfaces is described below.

The hub interface bus includes a bidirectional data path 251, a stop signal 253, a request A (RQA) signal 254, a request B (RQB) signal 255, a clock (CLK) signal 257 and data strobe (STROBE) signals 258. According to one embodiment, data path 251 is 8 bits wide. However, data path 251 may be any width that is a power of 2. Stop signal 243 is a bi-directional signal used for flow control. RQA signal 254 and RQB signal 255 are request signals that, during normal system operation, are asserted in order to request control of the hub interface bus. In addition, RQA signal 254 and RQB signal 255 may be used in various power management operations as will be described below.

STROBE signals 258 are used to synchronize data into a hub agent while operating in a source synchronous mode. According to one embodiment, STROBE signals 258 may clock data at four times the frequency of the clock signal. Alternatively, STROBE signals 258 may operate at a multiple of the clock signal other than four. For example, STROBE signals 258 may run at a rate of eight times that of the clock signal 257. Further, hub interface A may include other signal paths, such as a reset signal for resetting system 100.

Figure 3:
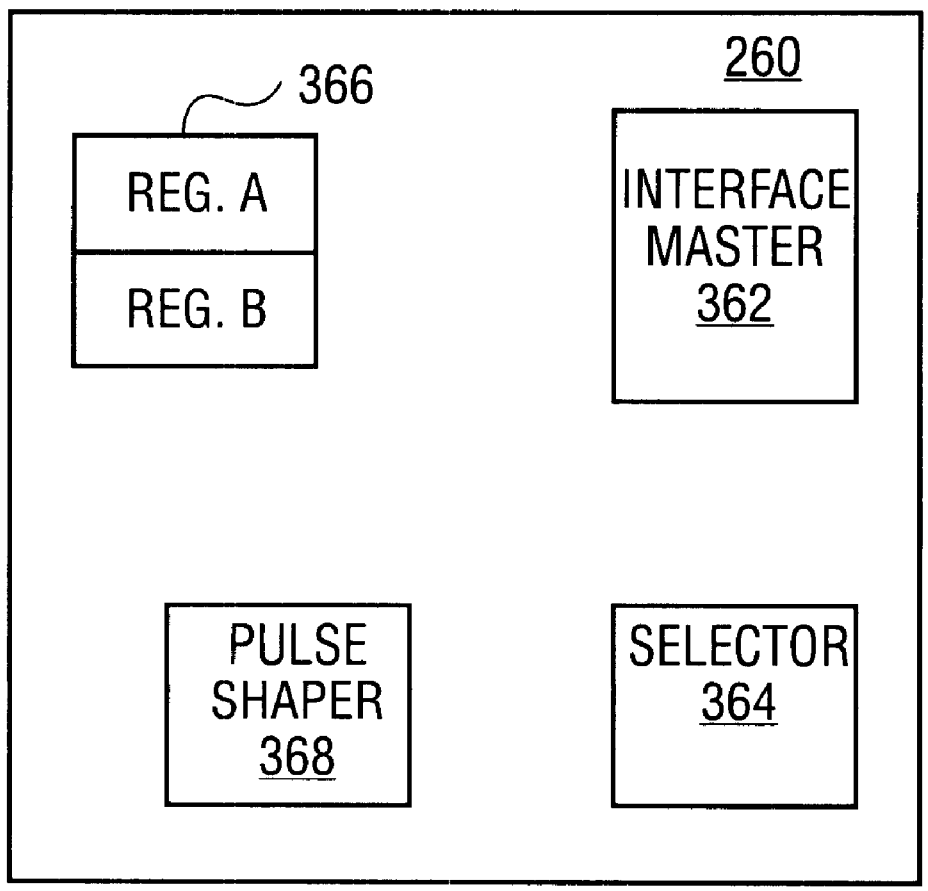
FIG. 3 is a block diagram of one embodiment of a control unit.

As described above, hub interface A is coupled to the agents via interface controls 120 within each agent. Interface controls 120 control the interaction between the hub interface agents. Interface controls 120 include control logic 260. FIG. 3 is a block diagram of one embodiment of control logic 260. Control logic 260 includes an interface master 362, a selector circuit 364, registers 366 and a pulse shaper 368. Interface master 362 in each agent arbitrates for ownership of the hub interface. The assertion of either the RQA signal 254 or the RQB signal 255 is an arbitration event.

At each arbitration event, arbitration unit 362 within the upstream and downstream agents examine both the RQA signal 254 and the RQB signal 255 and determine ownership of hub interface independently and simultaneously. When hub the interface is idle, the first of either the upstream or downstream agents to assert its request signal (RQA 254 and RQB 255, respectively) wins ownership. If the upstream and downstream agents request ownership simultaneously when the hub interface is idle, the least recently serviced hub agent wins ownership.

Selector unit 364 receives asynchronous pulses via the hub interface and transmits those pulses to interface controls 120 that are coupled to other hub interfaces. For example, a pulse received at ICH 140 from MCH 110 via hub interface A may be transmitted over hub interface B to network interface 160 by selector unit 364. According to one embodiment, selector unit 364 is a multiplexer. However, in other embodiments, selector unit 364 may be implemented using other select circuitry.

Registers 366 store data received at an agent via a hub interface. In one embodiment, registers 366 include two banks (Bank A and Bank B) of thirty-two bit latches. Banks A and B each include a flag bit that indicates whether they contain data. Pulse shaper 368 receives asynchronous pulses via hub interface A. Since the asynchronous pulses that are transmitted by selector unit 364 may become too narrow, pulse shaper 368 regenerates the pulse before it is transmitted to a subsequent hub interface. According to one embodiment, pulse shaper 368 is implemented using a pulse amplifier in agents that have a bridge function (i.e., agents that are coupled to a downstream hub interface). Alternatively, pulse shaper 368 may be implemented using asynchronous logic, such as, for example, reset-set latches. Although the description of interface controls 120 and control units 260 have been limited to the MCH 110 and ICH 140 agents coupled to hub interface A, the above description also applies to agents at other hub interfaces (e.g., the interface control 120 at the hub interface B).

Referring back to FIG. 2, ICH 140 is coupled to a clock generator 280. Clock generator 280 generates synchronizing clock pulses that provide the fundamental timing and internal operating frequency for components within computer system 100. In one embodiment, ICH 140 is the clock controlling agent within computer system 100 that controls the operation of clock generator 280 and other synchronization devices within system 100.

According to another embodiment, hub interfaces support various modes of computer system 100 operation. For example, the hub interfaces may support a low performance mode or a high performance mode. In the low performance mode, data transactions within computer system 100 are performed at a single multiple of an external bus and CLK frequency (1×mode). In the high performance mode, data transactions within computer system 100 are performed at a quadruple multiple of the external bus and CLK frequency (4×mode). The frequency multiplication necessary to achieve the 4×mode is implemented by including an analog phase locked loop (PLL) circuit within each hub interface agent. Alternatively, a single PLL may provide 4×mode pulses to the various components within system 100.

One drawback to operating hub interfaces in the 4×mode is that a higher quantity of power is consumed by computer system 100. Further, although less power is consumed during the 1×mode, significant amounts of energy may be wasted in the event one or more of the hub interfaces is not used while system 100 is maintained in a powered-up state. This can be particularly disadvantageous for portable computers, which rely on batteries for their power. Therefore, in order to make computer system 100 more energy-efficient, the hub interfaces operate in a clock disabled (low power) mode. In the low power mode, the system clock and PLLs are turned off and interface operation is suspended to further lower power consumption in computer system 100.

Figure 4:
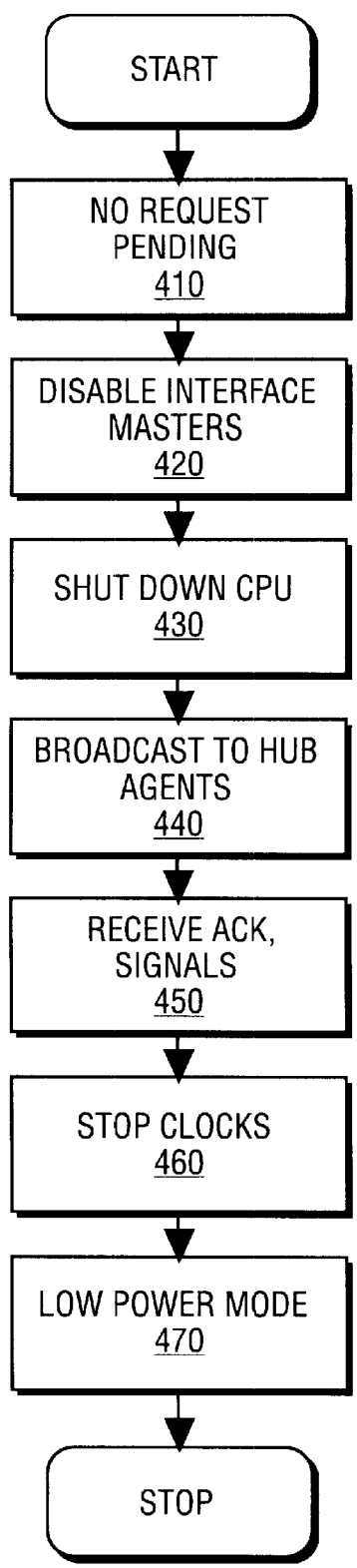
FIG. 4 is a flow diagram of one embodiment for the transition of a computer system to a low power state.

FIG. 4 is a flow diagram for one embodiment of the sequence for transitioning from the 1× or 4×modes to the low power mode in computer system 100. At process block 410, CPU 410 determines that no requests are pending to access hub interface A. At process block 420, transaction initiating logic in both hubs are disabled to prevent access of hub interface A from being granted to either MCH 110 or ICH 140, except for the power management sequence messages described below. At process block 430, ICH 140 begins the low power mode sequence by asserting a signal that puts CPU 102 in a powered down state. In response, CPU 102 transmits an acknowledge signal that is propagated over hub interface A to ICH 140. At process block 440, ICH 140 broadcasts to all hub interface agents connected to ICH 140 that system computer 100 is to enter the low power mode. For example, signals are transmitted to MCH 110, network interface 160 and bridge 165 indicating that the power down mode will soon be entered. Further, hub interface agents coupled to ICH 140 that are also coupled to a downstream agent transmit the low power mode signal to the downstream agent.

At process block 450, ICH 140 receives acknowledge signals from all of the hub interface agents indicating that the agents are ready to enter the low power mode. At process block 460, ICH 140 stops clock generator 280. Also, all agent PLLs are stopped if system 100 is operating in the 4×mode, or some other mode requiring a PLL (e.g., 8×mode). At process block 470, all hub interface agents enter the low power mode. Computer system 100 remains in the low power mode until ICH 140 receives a request indicating a need to exit the low power mode.

Figure 5:
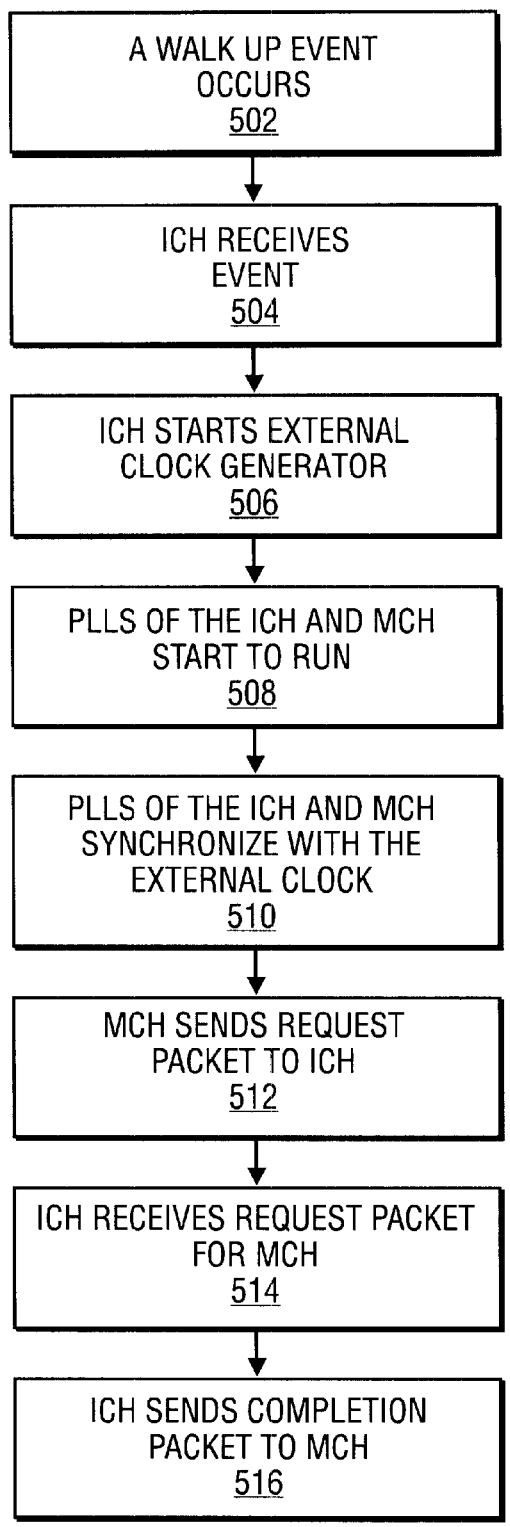
FIG. 5 is a flow diagram of one embodiment for the transition of a computer system from a low power mode.

FIG. 5 is a flow diagram for one embodiment of the operations for the transition of computer system 100 from a low power mode to a higher power mode. At process block 502, a triggering event occurs requiring computer system 100 to wake up (e.g., a user striking a key on a keyboard in computer system 100). The triggering event may be transmitted as an event signal to the ICH.

Figure 6:
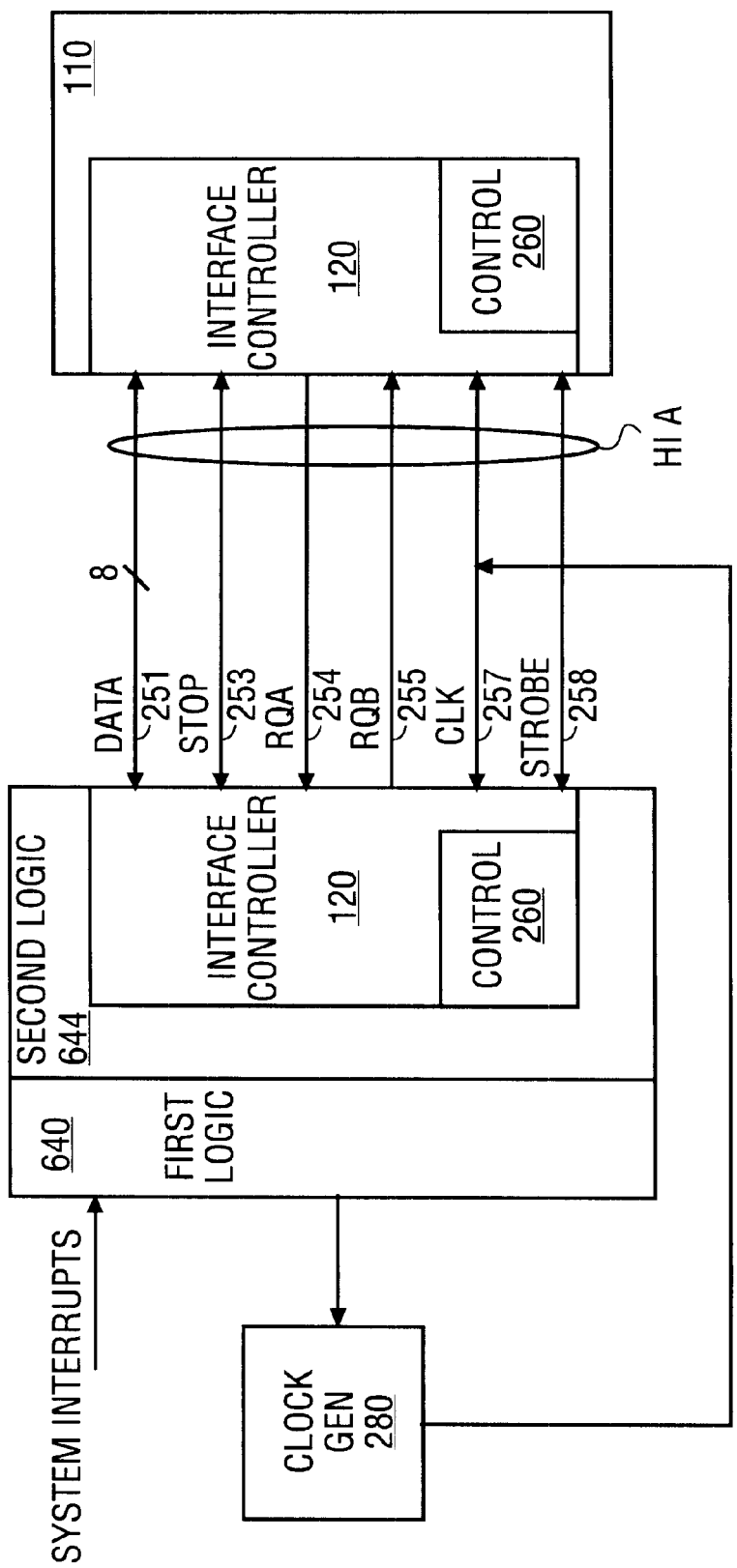
FIG. 6 is a block diagram of one embodiment a memory control hub (MCH) and an input/output control hub (ICH) connected via a hub interfac.

In one embodiment, the ICH consist of two logical sections, as shown in FIG. 6. In the low power mode, the first logical section 640 continues to run by receiving clocking from a clock external to the ICH. The first logical section 640 continues to receive clocking, in part to monitor for receipt of event signals, and in response initiate transition of the ICH and MCH from a low power state. The second logic section 644 of the ICH does not receive clocking when in a low power mode, but continues to receive power to retain state information that may be stored thereon.

At processing block 504, the first logic section of ICH receives the event initiated by the triggering event. At processing block 506, in response to receiving the event signal, the ICH sends a signal to the clock generator 280 to start the external clock generator 280. In an alternative embodiment, the MCH could include a section of logic that includes a separate second internal clock generator, which would remain running during the low power state. As a result, the MCH could receive event signals, and in response send a signal to the external clock generator to start the external clock generator 280.

In response to the clock generator 280 starting to clock, at processing block 508 the PLLs of the MCH and the ICH are restarted. In one embodiment, the MCH and the second logic section of the ICH include monitoring logic that monitors the clock generator 280 to start the PLLs in their respective hubs in response to the clock generator starting again. Thereafter, in processing block 510, the PLL in the ICH and the PLL in the MCH are synchronized with the external clock generator 280. Synchronizing of the ICH PLL and the MCH PLL with the external clock generators 280 may take different lengths of time with respect to each other.

In one embodiment, after the PLL of the MCH has been synchronized with the external clock generators 280, at processing block 512, the MCH will transmit an initialization completion packet to the ICH via the hub-interface to determine whether the ICH is ready to begin receiving and transmitting data. The ICH will receive the request packet from the MCH and may store the packet in registers 366. The ICH may or may not be awake (i.e., its PLL synchronized with the external clock generator) upon receiving the packet of data. In one embodiment, a flag bit of register A will be set to indicate receipt of data. In alternative embodiments, a flag bit is not used.

Upon waking up, at processing block 514, the ICH checks register A to determine if a packet of data has been received.

If the data has been received, the ICH transmits a completion packet to the MCH, process block 516. However, if the data has not been received, the ICH has woken up before the MCH. The ICH thereafter, waits to receive the data. Once the data has been received, the ICH transmits a completion packet to the MCH. After the MCH has received the completion packet from the ICH, each agent knows when the other is awake and ready to transmit and receive data across the hub-interface. In alternative embodiments, other types of acknowledgment signals may be used rather than a completion packet.

In an alternative embodiment, the ICH (rather than the MCH) could send the initialization data packet to the MCH, once the PLL of the ICH has synchronized with external clock generator 280. Alternatively, when either hub's PLL has completed synchronizing with the external clock generator, that respective hub could check to see if they have received a data packet from the corresponding hub. If a data packet has not been received, the respective hub could proceed to send a data packet to the opposing hub to inform the opposing hub that it is ready to begin transmitting and receiving data via the hub-interface.

In yet another alternative embodiment, either hub could further include a timer. As a result, upon receipt of an event, the timer could begin. If a predetermined amount of time lapses before receipt of an acknowledgment from the opposing hub (in response to an initiation packet), the hub that received the event could proceed to process and/or respond to the event without waiting for the opposing hub to provide an acknowledgment. Alternatively, if a predetermined amount of time lapses before receipt of an initialization packet from the opposing hub, the hub that received the event could proceed to process and/or respond to the event without waiting for the opposing hub to provide an acknowledgment.

For example, in the case of the ICH receiving an event indicating video data is present to be transferred to the MCH to be stored in memory, the ICH could wait a predetermined period of time for the MCH to wake up. After the period of time lapses without the MCH waking up, the ICH could respond to the provider of the video data, indicating no more data is to be sent at the moment.

Referring back to FIG. 2, the hub agents provide a central connection between two or more separate buses and/or other types of communication lines. By using the hub interface to interconnect the MCH 110 and the ICH 140, improved access is provided between I/O components and the CPU/memory subsystem (e.g., increased bandwidth, protocol independence, and lower latency.) In addition, the hub interface may also improve the scalability of a computer system (e.g., upgrading from a base desktop platform to high-end desktop platforms or workstation platform) by providing a backbone for I/O building blocks.

Figure 13:
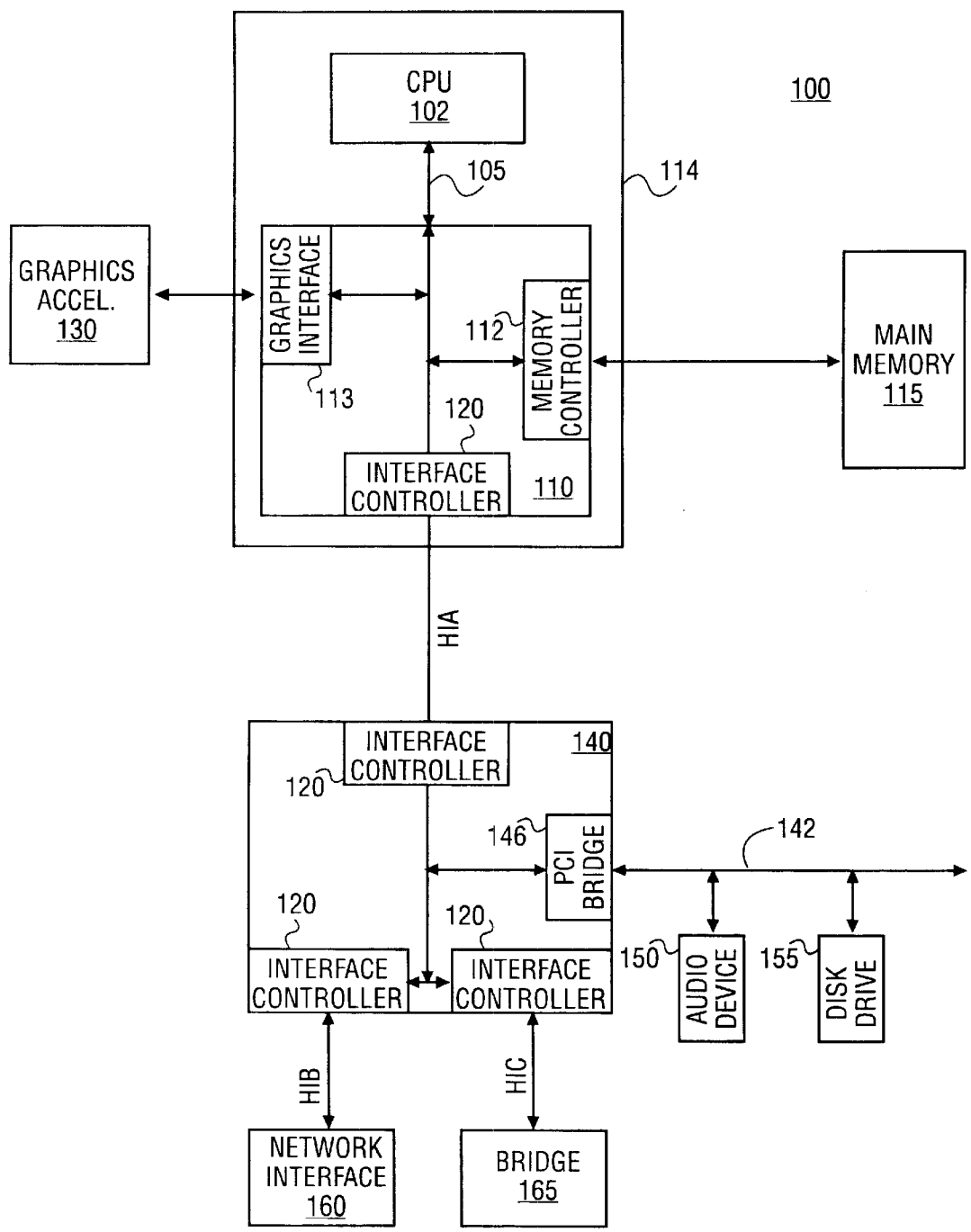
FIG. 13 is a block diagram of one embodiment of a computer system.

In an alternative embodiment, the CPU and the MCH are integrated on a single semiconductor unit 114, as shown in FIG. 13, wherein the single semiconductor unit 114 is coupled to the ICH via the hub-interface. In another alternative embodiment, the MCH and a graphics unit (e.g. control/accelerator) are integrated on a single semiconductor unit 114, wherein the single semiconductor unit 114 is coupled to the ICH via the hub-interface. In yet another alternative embodiment, the MCH, the graphics unit and the CPU are integrated on a single semiconductor unit 114, wherein the single semiconductor unit 114 is coupled to the ICH via the hub-interface.

To provide the improved interface, the hub interface includes one or more unique features. In one embodiment, transactions are transferred across the hub interface using a packet based split-transaction protocol. For example, a Request Packet is used to start a transaction and a separate Completion Packet may subsequently be used to terminate a transaction, if necessary.

Figure 7:
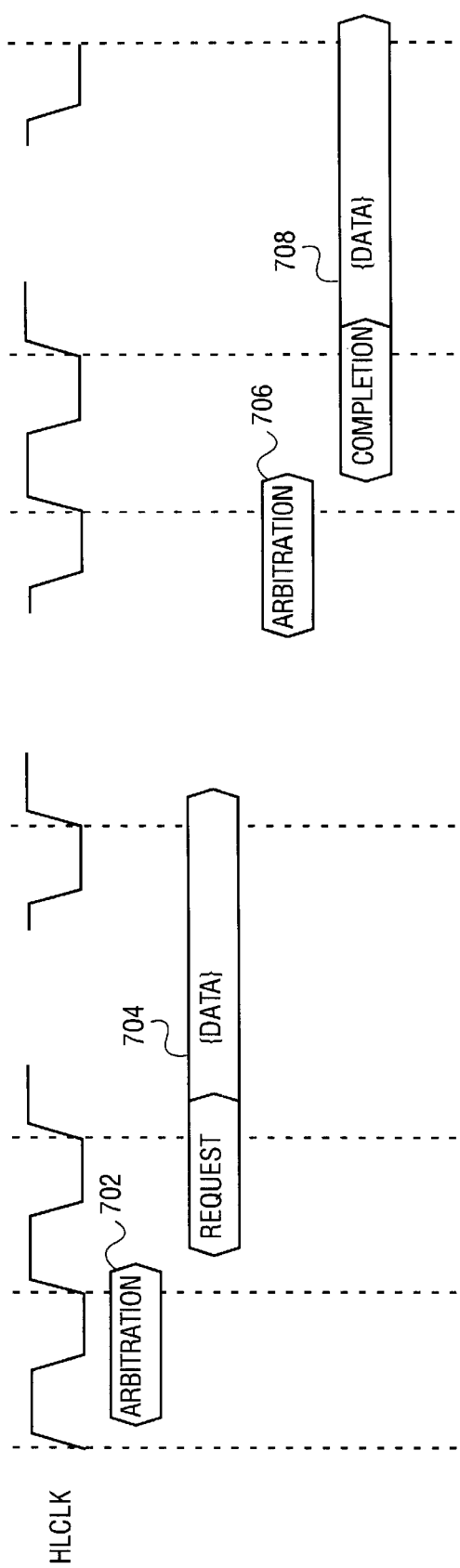
FIG. 7 is a timing diagram illustrating a split transaction implemented by one embodiment of an interface.

FIG. 7 illustrates an example of a split transaction across the hub interface. As illustrated in FIG. 7, a hub agent initially obtains ownership of the hub interface via arbitration 702. Following the arbitration, there is a request phase 704. If necessary (e.g., in the case of returning data for a read transaction), a completion phase 708 will follow the request phase. Prior to the completion phase, however, the responding hub agent, will first arbitrate 706 for ownership of the hub interface.

In between the time of transmitting a request packet and a corresponding completion packet across the hub interface, separate unrelated packets may be transmitted across the hub interface in accordance with predetermined order rules, as discussed below in more detail. For example in the case of a read request from a peripheral to memory, providing the requested data may take multiple clock cycles to have the data ready to be returned in a completion packet. During the time it takes to obtain the requested data, separate unrelated completion and/or request packets waiting in a queue/pipe of the MCH 110, may be transmitted to the ICH 140.

Furthermore, as shown in FIG. 7, each request or completion is transmitted as a packet across the interface. For write type transactions, data is associated with the request. For read type transactions, there will be data associated with the completion. In some cases, there will be more than one completion for a request for the case where the completion packet is disconnected, effectively splitting it into multiple completion packets.

In addition, in one embodiment, the hub interface uses transaction descriptors for routing of hub interface traffic as well as identifying the attributes of a transaction. For instance, the descriptors may be used to define a transaction as isochronous or asynchronous, which, as a result, may then be handled in accordance with a predefined protocol.

Furthermore, in one embodiment, the bandwidth of the interface is increased in part by transmitting the data packets via a source synchronous clock mode. Moreover, in one embodiment, the hub interface provides the increased bandwidth despite using a narrow connection (e.g., less pins/pads).

In alternative embodiments, however, a hub interface may be implemented with less than all of the unique features as discussed above, without departing from the scope of the invention. Moreover, the hub interface could also be used to interconnect bridges and and/or other components within or external to a chipset, without departing from the scope of the present invention.

TRANSACTION, PROTOCOL AND PHYSICAL LAYERS

For greater clarity, the hub interface is described in three parts: a transaction layer; a protocol layer; and a physical layer. The distinctions between layers, however, is to be regarded in an illustrative rather than a restrictive sense, and is therefore does not to imply a particular preferred embodiment.

TRANSACTION LAYER

In one embodiment of the hub interface, the transaction layer supports the routing of separate transactions transmitted across the hub interface (which may consist of one or more packets.) For example, in one embodiment, the transaction layer of the hub interface generates transaction descriptors, which are included in the requests and data packets. The transaction descriptors may be used to support arbitration between queues within a hub agent (e.g., MCH), and/or to facilitate routing of requests and data packets through the hub interface.

For instance, in one embodiment, the transaction descriptors support routing of completion packets back to the request-initiating agent based on initially supplied (within a request packet) routing information. The transaction descriptors also help to reduce or possibly minimize packet-decoding logic within the hub agents.

In alternative embodiments, the transaction descriptors also provide the S ability to distinguish the handling of requests based on their respective transaction attributes. For instance, the transaction attributes identified in the transaction descriptors may identify operations as Isochronous (i.e., operations that move fixed amounts of data on a regular basis; e.g., video or audio real time operations.) As a result, the operations, as identified by the transaction attributes, may be handled in accordance with a corresponding predetermined routing protocol in order to support a specific type of operation (e.g., isochronous.)

In one embodiment, the transaction descriptors include two fields: a routing field and an attribute field. In alternative embodiments, more or less fields may be used to provide one or more of the functions of the transaction descriptors, without departing from the scope of the invention.

In one embodiment, the routing field is a six-bit field used for packet routing, as shown below in Table 1. The size of the routing field, as well as the attribute field, may vary within the scope of the invention.

TABLE 1

| Routing Field of Transaction Descriptor | | | | | |
|---|---|---|---|---|---|
| 5 | 4 | 3 | 2 | 1 | 0 |
| Hub ID | | | Pipe ID | | |

As shown in Table 1, three bits of the routing field are used for the Hub ID which identifies the hub agent that initiated the transaction. In alternative embodiments, to provide a hub interface hierarchy exceeding 8, additional bits could be used in the routing field.

For example, there may exist multiple hub interface hierarchies in a system, in which case the agent at the top of the hierarchies should be capable of routing completions back to the base of the hierarchy. In this context, "hierarchy" consists of multiple connected hub interface segments starting from a hub interface "root" agent (e.g., a MCH). For instance, computer system 100 may have only one hub interface hierarchy. FIG. 1, however, illustrates an example of computer system 100 based on multiple hub interface hierarchies. In embodiments implementing only a one hub interface hierarchy, a default value of "000" may be used in the Hub ID field.

The remaining three bits of the routing field may be used to identify internal pipes/queues within a hub interface agent. For example the I/O Control Hub may support internal USB (Universal Serial Bus) host control traffic and Bus Mastering IDE (BM-IDE) traffic via separate "pipes." As such, the Pipe ID may be used communicate to the servicing agent (e.g., MCH) that traffic initiated by different "pipes" have different attributes, and may be handled in accordance with a predetermined protocol. If a hub interface agent does not implement separate internal pipes, it may use a default value of "000" in the Pipe ID field.

In an alternative embodiment, the transaction descriptors further include an attribute field. In one embodiment, the attribute field is a three-bit value, which specifies how a transaction is to be handled when a target hub interface agent receives it. In some cases, the attribute field helps a system support demanding application workload, which relies on the movement, and processing of data with specific requirements or other differentiating characteristics.

For example, the attribute field may support the isochronous movement of data between devices, as used by a few recently developed external busses. Such data movement requirements need to be maintained as data flows through the hub interface between I/O devices and the CPU/memory subsystem.

In alternative embodiments, additional transaction attributes may include the ability to differentiate between "snooped" traffic where cache coherency is enforced by hardware (i.e., chipset) and "non-snooped" traffic that relies on software mechanisms to ensure data coherency in the system. Moreover, another possible attribute would be an "explicitly prefetchable" hint, to support a form of read caching and allow for more efficient use of the main memory bandwidth.

Ordering Rules

The transaction descriptors can also be used to support ordering rules between transactions transmitted across the hub interface. For example, in one embodiment, transactions with identical transaction descriptors are executed in strong order (i.e., first come - first serve.)

Transactions having the same routing field but different attribute fields, however, may be reordered with respect to each other. For example, in one embodiment, isochronous transactions do not need to be strongly ordered with respect to asynchronous transactions.

In addition, in one embodiment of the hub interface, data transmissions are permitted to make progress over requests, either in the same direction or the opposite direction. Read completions flowing in one direction are allowed to pass read requests flowing in the same direction. And, write requests are allowed to pass read requests flowing in the same direction.

In alternative embodiments, however, the ordering rules for transactions travelling across the hub interface, may vary within the scope of the invention. For example, in one embodiment, the hub interface implements the ordering rules provided in Peripheral Component Interconnect (PCI) (Revision 2.2) to determine the flow of traffic across the hub interface in opposite directions.

PROTOCOL LAYER

In one embodiment, the hub interface uses a packet-based protocol with two types of packets: request and completion. A request packet is used for each hub interface transaction. Completion packets are used where required, for example, to return read data, or to acknowledge completion of certain types of write transactions (e.g., I/O writes and memory writes with requested completion). Completion packets are associated with their corresponding request packets by transaction descriptors and ordering, as previously discussed in the section on the Transaction Layer.

In addition, in one embodiment, the hub interface uses an arbitration protocol that is symmetric and distributed. For example, each hub agent drives a request signal, which is observed by the other agent attached to the same interface. No grant signal is used, and agents determine ownership of the interface independently.

Moreover, in one embodiment, no explicit framing signal is used. There is an implied relationship between the arbitration event that gives an agent ownership of the interface and the start of that agent's transmission. In alternative embodiment, framing signals could be used without departing from the scope of the invention.

The end of a packet transmission occurs when a hub interface agent that owns the interface (e.g., is in the process of transmitting data), releases its control of the interface by de-asserting a request signal. In addition, in one embodiment, flow control is also accomplished by using a STOP signal to retry or disconnect packets, as is described in more detail below.

Packet Definition

In one embodiment of the hub interface, data is transferred at a multiple rate (e.g., 1×, 4×, 8×) of the hub interface clock (HLCK), which in one embodiment is a common clock shared by the hub agents joined by the hub interface. The data is transmitted across a data signal path (PD) of the hub interface, which has an "interface width" of some power of two (e.g., 8, 16, 24, 32.) As a result, the hub interface may have varying data transfer granularities (i.e., transfer widths), depending upon the transfer rate and the width of the data signal path. For example, in the case of an eight-bit interface width in 4×mode, the transfer width is 32 bits per HLCK. As a result, by varying the transfer rate and/or the interface width of the data signal path, the transfer width (i.e., number of bytes transferred per HLCK) can be scaled.

In addition, in one embodiment, packets may be larger than the transfer widths. As a result, the packets are transmitted in multiple sections (i.e., packet widths.) In one embodiment, the packets are divided into packet widths the size of double words (32 bits).

In the case of a 32 bit transfer width, the bytes of a packet width are presented on the interface starting with the least significant byte (byte 0) and finishing with the most significant byte (byte 3), as shown below in Table 2. In the case of a 64 bit transfer width (e.g., a sixteen bit wide interface in 4×mode) the less significant double-word (packet width) is transferred on the lower bytes of the data signal (e.g., PD [0:7]) and the more significant double-word is transferred in parallel on the upper bytes of the data signal (e.g., PD [15:8]). The two examples are shown below in table 2.

TABLE 2

Byte Transmission Order for 8 and 16 Bit Interface Widths

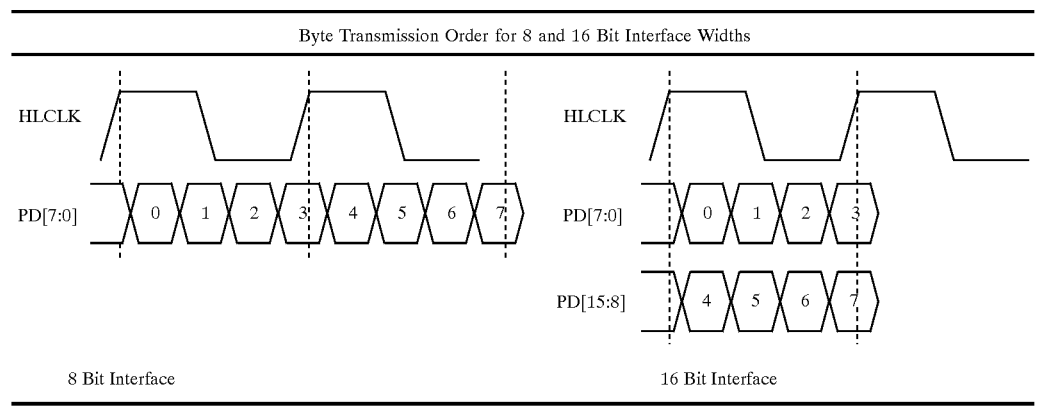

8 Bit Interface                 16 Bit Interface

The Protocol Layer of the hub interface is also responsible for framing the data. As such, the framing rules implemented by the hub interface define how to map one or more packet widths onto a set of transfer widths. To simplify the parsing of packets into packet widths, in one embodiment of the hub interface, the following three framing rules are implemented: a header section of a packet starts on the first byte of a transfer width; a data section of a packet (if present) starts on the first byte of a transfer width; and a packet occupies an integral number of transfer widths.

Any available transfer widths not consumed by a packet may be filled with a Don't Care double word (DW) transmission, and will be ignored by the receiving hub agent. In alternative embodiments, more, less, and/or different framing rules may be used by the hub interface within the scope of the present invention.

Table 3 and Table 4 set forth below, illustrate examples of the framing rules given above for the case of a 64 bit transfer width.

TABLE 3

Request using 32 Bit Addressing and Containing Three Double-words of Data

| 4th Byte Transmitted on PD[15:8] Byte 7 | 3rd Byte Transmitted on PD[15:8] Byte 6 | 2nd Byte Transmitted on PD[15:8] Byte 5 | First Byte Transmitted on PD[15:8] Byte 4 | 4th Byte Transmitted on PD[7:0] Byte 3 | 3rd Byte Transmitted on PD[7:0] Byte 2 | 2nd Byte Transmitted on PD[7:0] Byte 1 | First Byte Transmitted on PD[7:0] Byte 0 |
|---|---|---|---|---|---|---|---|
| Address (32b) |||| Request Header ||||
| Second DW of Data |||| First DW of Data ||||
| {DW} |||| Third DW of Data ||||

TABLE 4

Request using 64 Bit Addressing and Containing Three Double-words of Data

| 4th Byte Transmitted on PD[15:8] Byte 7 | 3rd Byte Transmitted on PD[15:8] Byte 6 | 2nd Byte Transmitted on PD[15:8] Byte 5 | First Byte Transmitted on PD[15:8] Byte 4 | 4th Byte Transmitted on PD[7:0] Byte 3 | 3rd Byte Transmitted on PD[7:0] Byte 2 | 2nd Byte Transmitted on PD[7:0] Byte 1 | First Byte Transmitted on PD[7:0] Byte 0 |
|---|---|---|---|---|---|---|---|
| Address (31:2) |||| Request Header ||||
| {DW} |||| Address (63:32) ||||
| Second DW of Data |||| First DW of Data ||||
| {DW} |||| Third DW of Data ||||

Request Packets

The packet header format for request packets, according to one embodiment, is shown below in Table 5 and Table 6. In the examples shown in Tables 5 and 6, the base header is one double-word, with one additional double-word required for 32 bit addressing, and two additional double-words required for the 64 bit addressing mode. The fields of the headers, as shown in Tables 5 & 6 are described below the tables.

In alternative embodiments of the hub interface, the fields included in the header of the request packet may vary without departing from the scope of the invention. For example, the header may include additional field, less fields, or different fields in place of the fields shown below. Moreover, the encoding of the fields may also vary without departing from the scope of the invention.

TABLE 5

Request Packet Header Format for 32 bit Addressing

| Last Byte Transmitted ← 31 30 29 28 27 26 25 24\|23 22 21 20 19 18 17 16\|15 14 13 12 11 10 9 8\|7 6 5 4 3 2 1 0 → First Byte Transmitted |||||||||||
|---|---|---|---|---|---|---|---|---|---|---|
| rq cp | r/ w | cr | af | lk | Transaction Desc. Routing Field | Re-served | TD Attr | Space | Data Length (DW) | Last DW BE | 1st DW BE | Base |
| Addr[31:2] |||||||||| R ea ct | Address |

TABLE 6

Request Packet Header Format for 64 bit Addressing

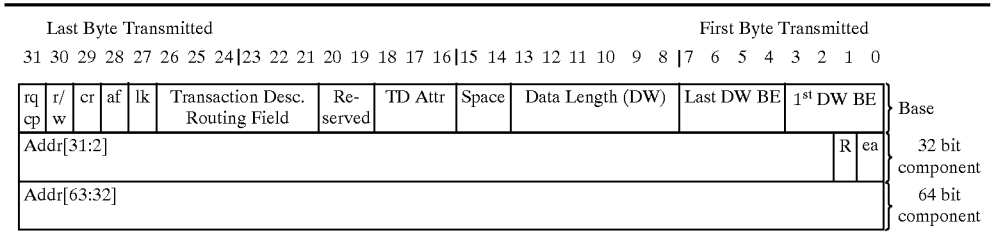

| Field | Description |
|---|---|
| Transaction Descriptor | The Transaction Descriptor Routing and Attribute fields as previously described. |
| rq/cp | Request packets are identified with a '0' and completion packets with a '1' in this location. |
| cr | Completion required ('1') or no completion required ('0'). |
| r/w | Read ('0') or Write ('1'). This field indicates if data will be included with a completion (read) or a request (write). |
| Address Format (af) | The addressing format is either Implied ('0') or 32/64 bit ('1'). |
| Lock (lk) | Flag to indicate that the request is part of a locked sequence. Requests and completions in a locked sequence will have this bit set. Hub agents, which do not comprehend lock, ignore this flag and will fill this field with '0'. |
| Data Length | The data length is given in double-words, encoded such that the number of double-words represented is one plus the number. Thus, "000000" represents one double-word. |
| Space | This field selects the destination space type for the request. In one embodiment, possible destination spaces include Memory ("00"), and IO ("01"). |
| 1st DW BE | Byte enables for the first double-word of any read or write request to Memory or IO. Byte enables are active low. If there is only one double-word for a request, this byte enable field is used. In one embodiment, it is illegal to issue a memory or IO read or write request with no bytes enabled. |
| Last DW BE | Byte enables for the last double-word of any read or write request. Byte enables are active low. If there is only one double-word for a request, this field must be inactive ("1111"). Byte enables may be discontiguous (e.g.: "0101"). This field is never used with special cycles since it overlaps the "Special Cycle Encoding" field. |
| Addr[31:2] | The 32 bit address is generated as it would be on PCI for same type of cycle. This double-word is included for the 32 and 64 bit addressing modes (but not for the implied addressing mode). |
| Extended Address (ea) | Indicates 32 bit addressing ('0') or 64 bit addressing ('1'). |
| Config Type (ct) | For configuration cycles only, this bit is used to indicate Type 0 ('0') or Type 1 ('1') configuration cycle type. Because configuration cycles will always be performed with 32 bit addressing, this bit is overlapped with the "Extended Address" bit. |
| Addr[63:32] | Upper address bits for 64 bit addressing mode. This double-word is included for the 64 bit addressing mode. |

Completion Packets

The header format for a completion packet, according to one embodiment, is shown below in Table 7. In one embodiment, the header is one double-word. The fields of the headers, as shown in Table 8 are described following the table.

In alternative embodiments of the hub interface, however, the fields included in the header for a completion packet may vary without departing from the scope of the invention. For example, the header may include additional field, less fields, or different fields in place of the fields as described and shown below. Moreover, the encoding of the fields may also vary without departing from the scope of the invention.

TABLE 7

Completion Packet Header Format

| Last Byte Transmitted | | | | | | | | | First Byte Transmitted |
|---|---|---|---|---|---|---|---|---|---|
| 31 30 29 28 27 26 25 24 | 23 22 21 20 19 18 17 16 | 15 14 13 12 11 10 | 9 8 | 7 6 5 4 3 2 1 0 | | | | | |
| rq/cp | r/w | Reserved | lk | Transaction Desc. Routing Field | Reserved | TD Attr | Rsvd | Data Length (DW) | Completion Status |

| | |
|---|---|
| Transaction Descriptor | The Transaction Descriptor Routing and Attribute fields as previously discussed in the Transaction section. |
| rq/cp | Completion packets are identified with a '1' in this location. |
| r/w | Read ('0') or Write ('1'). This field indicates if data will be included with a completion (read) or a request (write). |
| Lock (lk) | Flag to indicate that the completion is part of a locked sequence. Requests and completions in a locked sequence will have this bit set. Agents, which do not comprehend lock, ignore this flag and will fill this field with '0'. |
| Data Length | The data length is given in double-words, encoded such that the number of double-words represented is one plus this number. Thus, "000000" represents one double-word. |
| Completion Status | Indicates completion status using predetermined. |
| Reserved | All reserved bits are set to '0'. |

In one embodiment of hub interface, completions for memory reads may provide less than the full amount of data requested so long as the entire request is eventually completed. Likewise, completions for memory writes may indicate that less than the entire request has been completed. This might be done to satisfy a particular hub interface latency requirement for a particular platform.

In addition, for a request that requires completion, the initiator, in one embodiment, retains information about the request, which may be stored in a buffer of the initiating hub agent. For example, this information may include the transaction descriptor, the size of the packet, lock status, routing information, etc. Furthermore, when receiving the completion(s), the initiator matches the completion(s) with the corresponding request. In the case of multiple completions, the initiator accumulates a count of the data completed for the original request until the original request is fully completed.

Interface Arbitration and Packet Framing

In one embodiment of the hub interface, when the interface is idle, the assertion of a request from either hub agent connected to the interface is considered an arbitration event. The first agent to request wins ownership of the interface. If agents request ownership simultaneously when the hub interface is idle, the least recently serviced hub agent wins. In one embodiment, all hub agents track the least recently serviced status (e.g., via a status flag of an internal register.) In alternative embodiment, alternative arbitration routines may be used within the scope of the present invention.

Once a hub agent acquires the ownership of the interface, it will continue to own the interface until it completes its transaction, or until an allocated time bandwidth expires. For example, in one embodiment, a timeslice counter is provided in each hub agent to control bandwidth allocation and to limit an agent's interface ownership tenure. The time allotted to a hub agent (i.e., timeslice value) may be different or the same for hub interface agents attached to the same interface. The timeslice counter is started upon acquiring ownership of interface and counts hub interface base clock periods.

In one embodiment, each hub agent is responsible for managing its own timeslice allocation. As such, in one embodiment, a timeslice value may be programmed via a hub interface command register for each interface in each hub agent.

Figure 8:
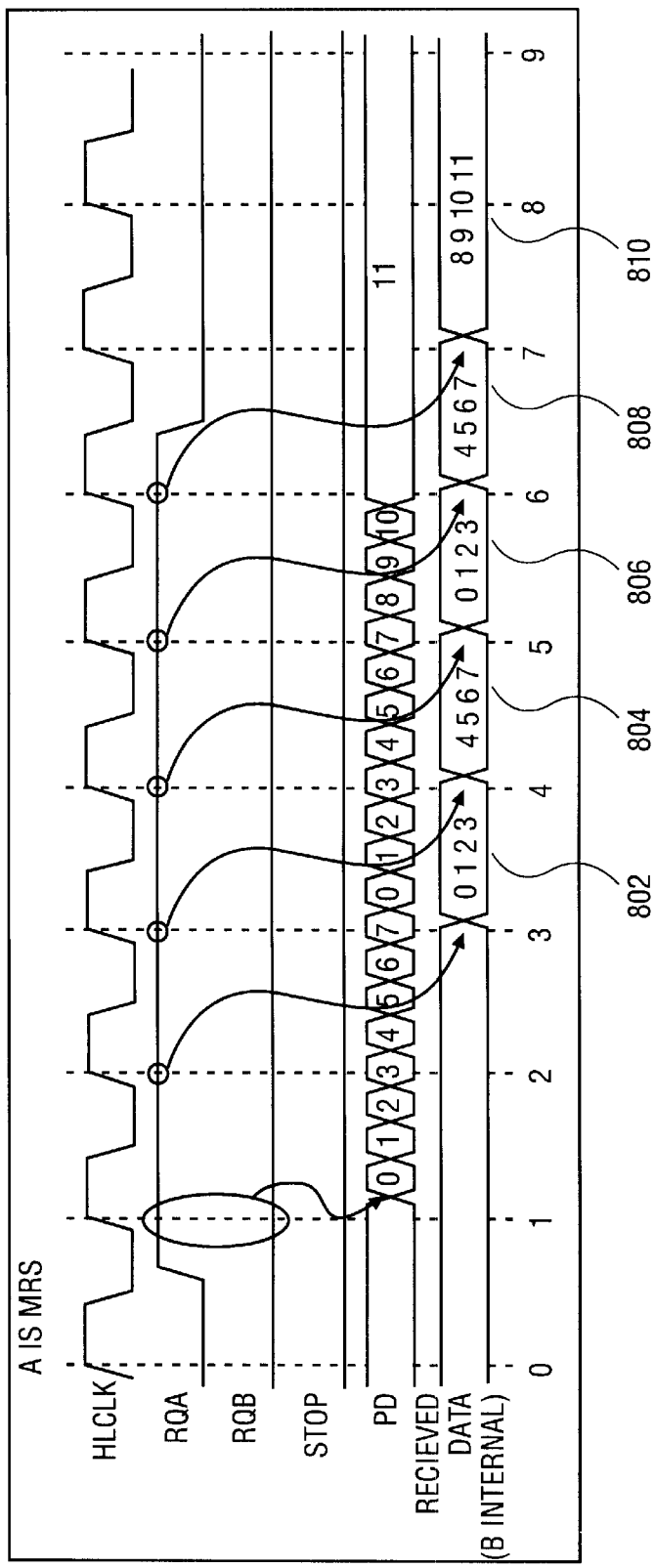
FIG. 8 is a timing diagram illustrating arbitration and transmission of data packets, according to one embodiment.

FIG. 8 illustrates an example of arbitration for the hub interface between hub agent A and agent B and the transfer of two packets. The example illustrates arbitration out of an idle interface state, with the interface then returning to idle. Moreover, in the example illustrated, the interface is using a 4x data transfer mode with eight bit data signal (PD) path. Agent A, in the example illustrated in FIG. 8, is the most recently serviced (MRS) agent. As a result, Agent A asserts its external request signal (RQA) and samples the state of the Agent B's request signal (RQB) on clock edge 1 (which is shown to be inactive) before starting packet transmission off the same edge.

In one embodiment, there is a two clock delay before the transmitted data (i.e., data from Agent A) is available internally in the receiver (i.e., Agent B), starting from clock edge 3. The first packet consists of two double-words 802 and 804 and requires two base clocks to transmit in the 4xmode. The second packet is three double-words 806, 808, and 810, and so requires three base clocks in the 4xmode.

Flow Control

In one embodiment, packets may be retried or disconnected by a receiving agent due to lack of request queue space, data buffer space, or for other reasons. In one embodiment, Flow control is accomplished using a STOP signal.

Figure 9:
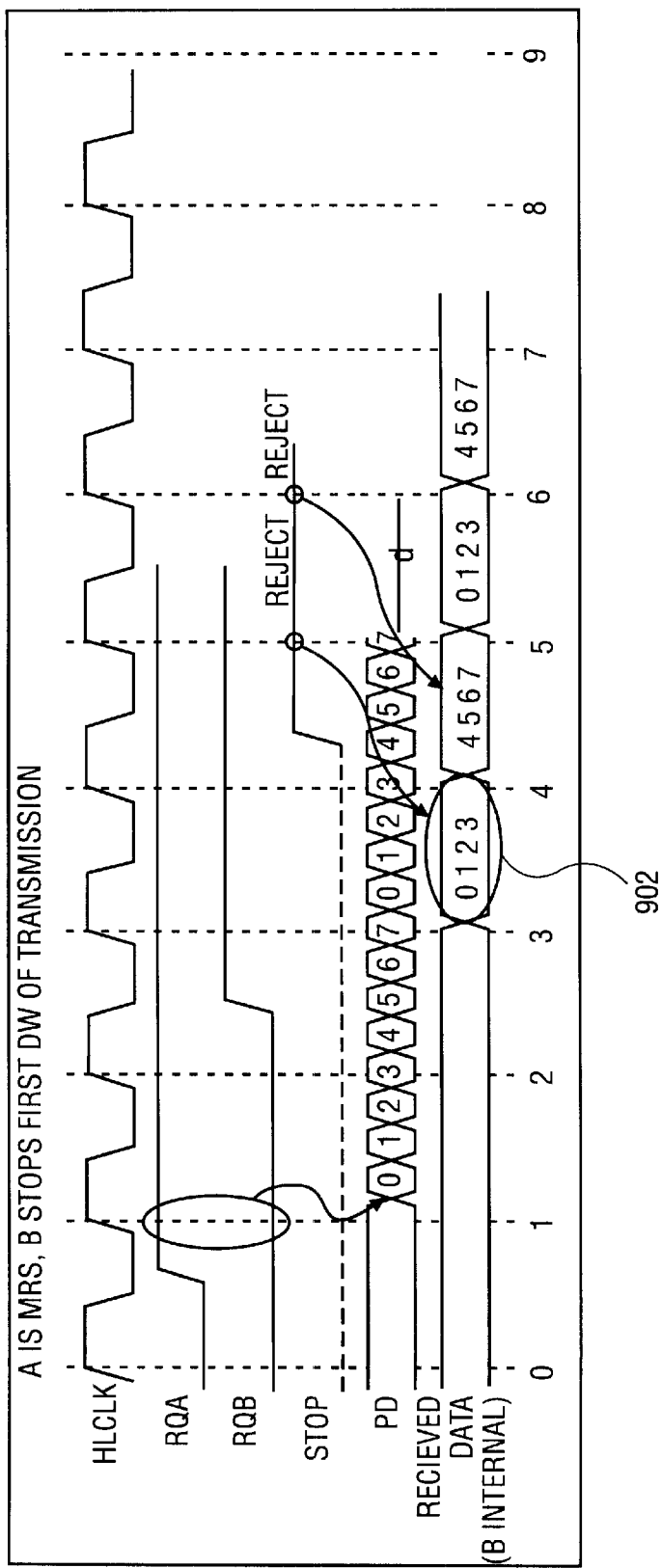
FIG. 9 is a timing diagram illustrating flow control of data packets, according to one embodiment.

FIG. 9 illustrates an example of the use of STOP signal. As illustrated, Agent A asserts its external request signal (RQA) and samples the state of the Agent B's request signal (RQB) on clock edge 1 (which is shown to be inactive) before starting packet transmission off the same edge (e.g., clock edge 1.)

Following a two clock delay, the data transmitted from Agent A is available internally in the receiver at Agent B, starting from clock edge 3. In one embodiment, following receipt of data transmitted from Agent A, is the first opportunity for Agent B to enact flow control by asserting the STOP signal, as illustrated in FIG. 9, at clock edge 4.

In addition, when ownership of PD signal changes from one hub agent to another, ownership of the STOP signal will be also be exchanged following a predetermined number of clocks. Moreover, in one embodiment, the STOP signal is sampled on base clocks, which correspond to the final transfer of a packet width. For example, in a 4×mode (using an eight bit wide PD signal), the STOP signal is sampled each base clock. However, for a 1×mode, the STOP signal is sampled each fourth clock (with the beginning of a transaction being used as a reference point).

Figure 10:
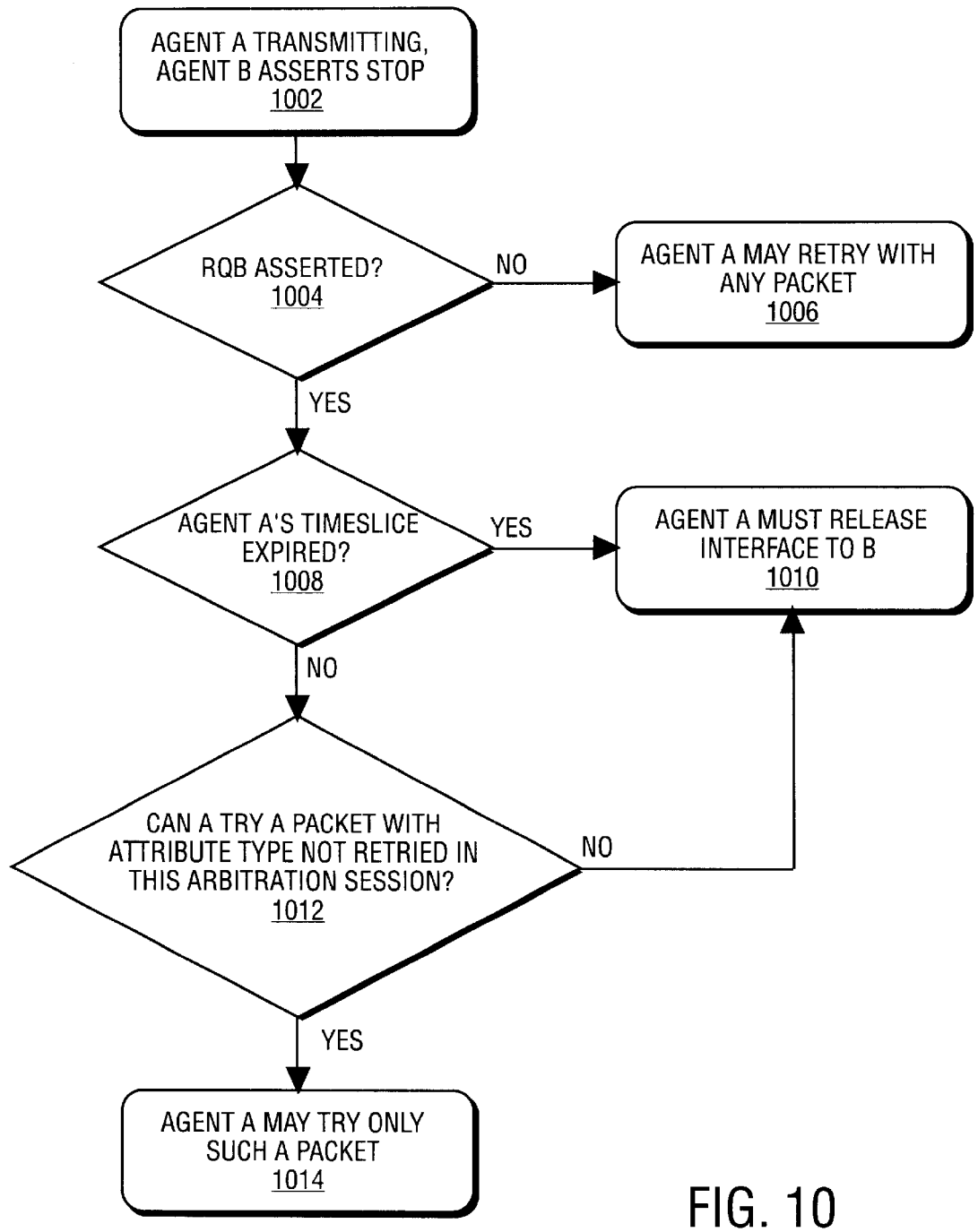
FIG. 10 illustrates a flow diagram describing the steps of responding to flow control operations according to one embodiment.

Following the reception of a STOP signal, the hub agent that receives the STOP signal determines whether it may retry sending additional packets. FIG. 10 is a flow diagram describing the steps performed by a hub agent in determining whether it may retry sending a packet following receipt of a STOP signal, according to one embodiment.

In step 1002, a hub agent that is currently transmitting packets receives a STOP signal. In response, in step 1004 the hub agent that receives the STOP signal determines if the other agent (which activated the STOP signal) is requesting ownership of the interface, by sampling the other hub agents request signal (e.g., RQB.)

If the recipient of the STOP signal determines that the agent which sent the STOP signal is not requesting ownership of the interface, in step 1006 the current owner of the interface may attempt to transmit a packet following recovery from the STOP. On the other hand, if it is determined that the agent which activated the STOP signal is requesting ownership, in step 1008, the current owner determines if its timeslice has expired.

If the timeslice for the current owner of the interface has expired, in step 1010, the current owner releases ownership. If the timeslice for the current owner has not expired, the current owner may transmit a packet with an attribute that is different from the interrupted packet. More specifically, in step 1012, the current owner determines if it has a packet with a attribute type that is different from any packets that have been retried in the present arbitration session (i.e., the period of the current owner's tenure), which needs to be transmitted.

If the current owner does have a packet with a different attribute, in step 1014 the current owner may attempt to transmit the packet. Otherwise, the current owner release ownership of the interface.

PHYSICAL INTERFACE

In one embodiment, the hub interface implements a physical interface that operates at a base frequency of either 66 MHz or 100 MHz. Other frequencies may also be used. In addition, in one embodiment, the physical interface uses a source synchronous (SS) data transfer technique which can be quad-clocked to transfer data at 4× of the base hub interface clock. As a result, in an embodiment having an 8-bit data interface (e.g., PD) operating at a base frequency of 66 MHz or 100 MHz, a bandwidth of 266 megabytes per second (MB/s) or 400 MB/s may be achieved, respectively.

Furthermore, in one embodiment, the hub interface supports a voltage operation of 1.8V, and is based on complementary metal-oxide semiconductor process (CMOS) signaling. In an alternative embodiments, however, the interface may operate at alternative frequencies and/or alternative sized data interfaces to provide varying bandwidths, and support alternative operating voltages, based on alternative signal processing, without departing from the scope of the invention.

External Signals Definition

Figure 11:
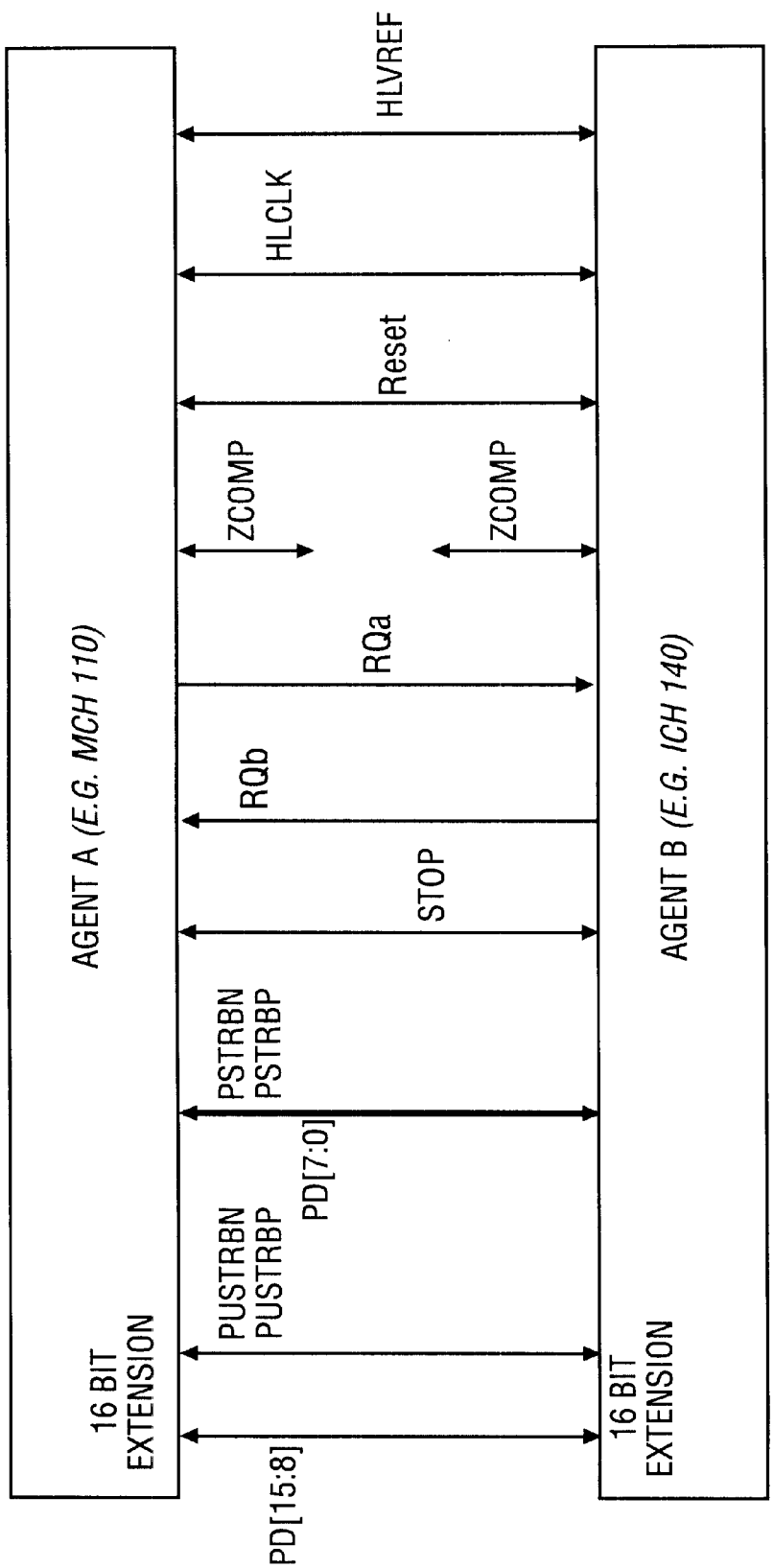
FIG. 11 illustrates the physical signal interface according to one embodiment.

FIG. 11 illustrates the physical signal interface of the hub interface between two hub agents, according to one embodiment. As shown in FIG. 11, the hub interface physical interface uses a bi-directional eight bit data bus (PD [7:0]) with a differential pair of source synchronous strobe signals (PSTRBN, PSTRBP) for data clocking. In an alternative embodiment, the interface can widened. For example, as shown in FIG. 11, an additional eight bit data bus (PD [15:8]) can also be used along with an additional pair of pair of source synchronous strobe signals (PUSTRBN, PUSTRBP.) Moreover, in an alternative embodiment, unidirectional data signals could be used.

In addition, one unidirectional arbitration signal connects each agent to the other (RQA, RQB), and a bidirectional STOP signal is used by the receiving agent to control data flow, as previously described. Additional interface signals include the system reset (Reset), common clock (HLCLK) and voltage reference signals (HLVREF). As well, signals for each hub agent (ZCOMP) to match its driver output impedance to the appropriate value to compensate for manufacturing and temperature variations are also included.

The physical signals shown in the interface illustrated in FIG. 11 are further described below in Table 8. In alternative embodiments of the hub interface, the signals included in the physical interface may vary without departing from the scope of the invention. For example, the physical interface may include more, less or different signals varying from the signals shown in FIG. 11 and further described below in Table 8.

TABLE 8

Hub Interface Signals for Eight Bit Agents

| Name | Bits (Pads) | Type | Clock Mode | Description |
|---|---|---|---|---|
| PD[7:0] | 8 | ASTS[1] | SS[2] | Packet data pins. The data interface when idle, in one embodiment, is held by active sustainers at the last voltage value to which it was driven. |
| PSTRBP | 1 | ASTS | SS | Negative PD Interface Strobe (default voltage level = VSSHL) and Positive PD Interface Strobe (idle voltage level = VCCHL) together provide timing for 4X and 1X data transfer on the PD[7:0] interface. The agent that is providing data drives this signal. PSTRBN and PSTRBP should be sensed fully differentially at the receiver. |

TABLE 8-continued

Hub Interface Signals for Eight Bit Agents

| Name | Bits (Pads) | Type | Clock Mode | Description |
|---|---|---|---|---|
| PSTRBN | 1 | ASTS | SS | Positive PD Interface Strobe, see PSTRBP description above. |
| RQB | 1 | I/O | $CC^3$ | Active-high request from agent A (output from A, input to B) to obtain ownership of the hub interface. RQa is asserted when agent A has data available to send, and is deasserted when either all of agent A's data has been sent or agent A determines that is should release the interface. Reset voltage value is VSSHL. |
| RQA | 1 | I/O | CC | Request from agent B (output from B, input to A). See above description of RQa. |
| STOP | 1 | ASTS | CC | Used for pipelined flow control to retry or disconnect packets. |
| HLCLK | 1 | 1 | N/A | hub interface base clock, in one embodiment, either 66 MHz or 100 MHz. This provides timing information for the common clock signals (described further below). |
| RESET# | 1 | 1 | CC | Active-low reset indication to hub interface agents.[4] |
| HLVREF | 1 | 1 | N/A | Voltage reference (VCCHL/2) for differential inputs. In one embodiment, the voltage is generated on the motherboard through a voltage divider. |
| HLZCOMP | 1 | I/O | N/A | Provides Impedance Compensation. |
| VCCHL | 4 | power | N/A | 1.8 V |
| VSSHL | 4 | ground | N/A | |
| Total: | 25 | | | |

[1]ASTS = Actively Sustained Tri-State.
[2]SS = Source Synchronous Mode Signal
[3]CC = Common Clock Mode Signal
[4]In one embodiment, Reset is a system-wide signal; it is an output from one component of the system and an input to the other component(s). Moreover, Reset is asynchronous with respect to HLCLK.

Common Clock Transfer Mode Operation

In one embodiment, many of the signals transmitted across the hub interface are transmitted in accordance with a common clock mode. More specifically, the timing of the signals that are transmitted via the common clock mode are referenced to a single clock (e.g., the hub interface clock.) In alternative embodiments, the signals may be tied to a system clock, exterior to the hub interface agents. Moreover, there may be more than one hub interface segment in a system, in which case different base clocks may be used for the different segments. For example, one component might implement both a 66 MHz base hub interface and a 100 MHz base hub interface.

Source Synchronous Transfer Mode Operation

In one embodiment, the packets/data are transmitted using a source synchronous clock mode, which provides a technique for multiplying the data transfer rate of data. For example, in an embodiment using 4×source synchronous clocking mode with an eight bit data signal path, transmitting a double-word (i.e., four byte) requires only one hub interface clock cycle (HLCK.) Alternatively, transmitting a double word using 1×source synchronous clocking mode on an eight bit data signal path would require a full hub interface clock cycle to complete.

More specifically, in one embodiment of source synchronous transmission, strobes (e.g., PSTRBN/PSTRBP) are sent with a data transmission in accordance with a predetermined timing relationship between the strobes and the data. The strobes are thereafter used to latch the data into the receiving hub agent.

More specifically, in one embodiment, the edges of the strobes PSTRBP/PSTRBN are used by the receiving hub agent to identify the presence and timing of data being transferred across the data signal paths. For example, as illustrated in the timing diagram of FIG. 12, in one embodiment a first data transfer corresponds to the rising edge of PSTRBP and the falling edge of PSTRBN. A second data transfer corresponds to the rising edge of PSTRBN and the falling edge of PSTRBP.

Figure 12:
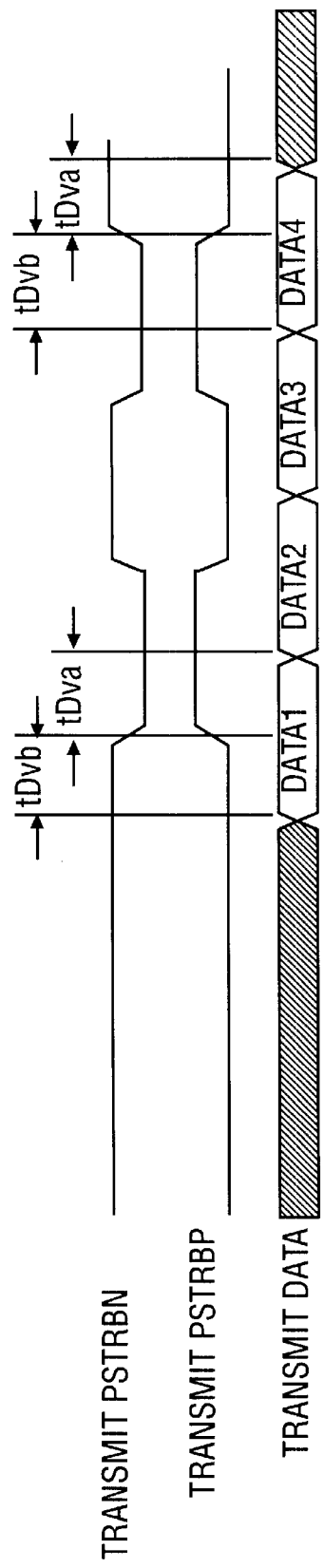
FIG. 12 is a timing diagram illustrating source synchronous clocking according to one embodiment.

In addition, in one embodiment, as further shown in FIG. 12, the transmit edges of the strobes PSTRBP/PSTRBN are positioned near the center of the data valid window. As a result, the receiving agent is given an input data sampling window to accommodate various system timing skews. Moreover, in one embodiment a minimum data valid before strobe edge (tDvb), and a minimum data valid after strobe edge (tDva) are also used by the receiving hub agent to identify and latch data being transmitted. Once the receiving hub agent latches the incoming data, the data is thereafter held for brief period to resynchronize the data with the hub interface clock (HLCK) before being passed along within the hub agent.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A first control hub component comprising:
   a first logic to synchronize an internal clock generator of said first control hub with an external clock generator in response to the external clock generator transitioning to a high power state
   said first logic, in response to said internal clock generator synchronized with said external clock generator, initiates said control hub to transmit a request packet to a second control hub via an interface; and said first logic to monitor said interface for receipt of a completion packet in reply to said request packet, wherein in response to said completion packet said first control hub is operable to continue communication with said second hub via said interface.

2. The first control hub of claim 1, wherein the first control hub is integrated with a processor on a single semiconductor unit.

3. The first control hub of claim 1, wherein the first control hub further includes a second logic to initiate the external clock generator to transition to a high power state in response to an event from a system component.

4. A first control hub component comprising:

a first logic to initiate an external clock generator, coupled to said first hub, to transition to a high power state in response to an event from a system component;

a second logic to synchronize an internal clock generator of said first control hub with said external clock generator in response to the external clock generator transitioning to said high power state;

said second logic to receive a request packet from a second control hub, coupled to said first control hub via an interface, and store said request packet in a first storage location; and in response to said internal clock generator synchronized with said external clock generator and receipt of said request packet, said second logic transmits a completion packet to said second control hub, wherein in response to transmitting said completion packet, said first control hub is operable to continue communication with said second hub via said interface.

5. The first hub component of claim 4 wherein:

said first logic remains in operation when said first hub component is in a low power state, and said second logic unit is not in operation when said first hub component is in said low power state.

6. The first hub component of claim 5 wherein:

said interface having a data signal path to transmit data in packets via split transactions, and said interface including a set of command signals, wherein said interface provides a point-to-point connection between said first and second control hub, exclusive of an external bus connected directly to the point-to-point connection.

7. A computer system comprising:

a processor;

an external clock generator;

at least one peripheral component; and a first control hub having a first logic to synchronize an internal clock generator of said first control hub with an external clock generator in response to the external clock generator transitioning to a high power state said first logic, in response to said internal clock generator synchronized with said external clock generator, initiates said first control hub to transmit a request packet to a second control hub via an interface; and said first logic to monitor said interface for receipt of a completion packet in reply to said request packet, wherein in response to said completion packet said first control hub is operable to continue communication with said second hub via said interface.

8. The computer system of claim 7 further includes a second control hub which comprises:

a first logic to initiate said external clock generator to said high power state in response to an event from a system component;

a second logic to synchronize an internal clock generator of said second control hub with said external clock generator in response to the external clock generator transitioning to said high power state;

said second logic to receive a request packet from said first control hub, and store said request packet in a first storage location; and in response to said internal clock generator synchronized with said external clock generator and receipt of said request packet, said second logic transmits a completion packet to said first control hub, wherein in response to transmitting said completion packet, said second control hub is operable to continue communication with said first control hub via said interface.

9. The computer system of claim 8, wherein said first logic of said second control hub remains in operation when said second control hub is in a low power state, and said second logic unit is not in operation when said second control hub is in said low power state.

10. The computer system of claim 9 wherein said interface includes a data signal path to transmit data in packets via split transactions, and said interface including a set of command signals, wherein said interface provides a point-to-point connection between said first and second control hub, exclusive of an external bus connected directly to the point-to-point connection.

11. The computer system of claim 10, wherein said first control hub is integrated with said processor on a single semiconductor unit.

12. A method comprising:

a first logic of a first control hub synchronizing an internal clock generator of said first control hub with an external clock generator in response to the external clock generator transitioning to a high power state said first logic, in response to said internal clock generator synchronized with said external clock generator, transmitting a request packet to a second control hub via an interface; and said first logic monitoring said interface for receipt of a completion packet in reply to said request packet, wherein in response to said completion packet said first control hub is operable to continue communication with said second hub via said interface.

13. The method of claim 12, further comprising:

a first logic of said second control hub, initiating said external clock generator to transition to a high power state in response to an event from a system component;

a second logic of said second control hub synchronizing an internal clock generator of said second control hub with said external clock generator in response to the external clock generator transitioning to said high power state;

said second logic of said second control hub receiving a request packet from said first control hub and storing said request packet in a first storage location; and in response to said internal clock generator synchronizing with said external clock generator and receipt of said request packet, said second logic of said second control hub transmitting a completion packet to said first control hub, wherein in response to transmitting said completion packet, said second control hub is operable to continue communication with said first hub via said interface.

14. The method of claim 13 further comprising:

said first logic of said second control hub remaining in operation when said second control hub is in a low power state, and said second logic of said second control hub is not in operation when said second control hub is in said low power state.

15. The method of claim 14, wherein the interface includes a data signal path to transmit data in packets via split transactions, and said interface including a set of command signals, wherein said interface provides a point-to-point connection between said first and second control hub, exclusive of an external bus connected directly to the point-to-point connection.

16. The method of claim 15, wherein said first control hub is integrated with a processor on a single semiconductor unit.

* * * * *